March 23, 1965 P. L. E. M. LAMORT 3,174,622
APPARATUS FOR CLEANING LIQUIDS CONTAINING IN SUSPENSION
SOLID PARTICLES AND PARTICULARLY CELLULOSIC PULPS
Filed Jan. 17, 1961

INVENTOR.
Pierre L. E. M. Lamort

BY
Michael J. Striker

United States Patent Office 3,174,622
Patented Mar. 23, 1965

3,174,622
APPARATUS FOR CLEANING LIQUIDS CONTAINING IN SUSPENSION SOLID PARTICLES AND PARTICULARLY CELLULOSIC PULPS
Pierre Louis Emile Marie Lamort, Vitry-le-Francois, France, assignor to E. & M. Lamort Fils, an Anonymous Society, Vitry-le-Francois, France, a society of France
Filed Jan. 17, 1961, Ser. No. 83,252
Claims priority, application France, Jan. 22, 1960, 816,392; July 8, 1960, 832,444
6 Claims. (Cl. 209—273)

The present invention relates to an apparatus for cleaning liquids which contain in suspension solid particles and especially cellulosic pulps.

The cleaning of these latter is carried out according to two general methods:

By separation accelerated due to the action of a centrifugal force, this operation is generally effected in a cyclone apparatus, in which the rotation of the liquid is obtained by the liquid reaching a cylindrical or conical chamber with a vertical axis in a tangential direction. This method is particularly suitable for separating the heavy impurities.

By screening through a perforated screen, the apertures of which permit the passage of the fine elements of the suspension and retain the larger impurities. This method is mainly suitable for the light impurities.

The screening apparatus themselves are classified into two main types: that in which the declogging (or cleaning) of the screen is obtained by the action of blades (or vanes) moving in the liquid and creating pulsations in the latter, and that in which the blocking of the screen is avoided by imparting to it a vibratory (or beating) movement of more or less high frequency.

The present invention has for its object an apparatus which enables the two cleaning methods referred to above to be achieved simultaneously by the combination of a centrifugal separation effect by means of a cyclone and a screening effect by means of a screen disposed centrally of the cyclone, and the declogging of which is obtained by the pulsations generated by the action of moving blades. The apparatus is moreover so arranged that it is possible, if necessary, to communicate a vibratory movement to the screen for increasing the efficiency thereof.

The apparatus according to the invention effects a separation firstly of the heavy impurities and secondly of the light impurities. An original device is provided for permitting the extraction of these latter without causing the entrainment of a considerable quantity of fine elements, thus avoiding the recovery thereof in an auxiliary apparatus.

All this has led the inventor to adopt special devices which will become apparent from the following description and/or from the accompanying drawing, which gives only one of many apparatus according to the present invention and in which.

Figure 1:
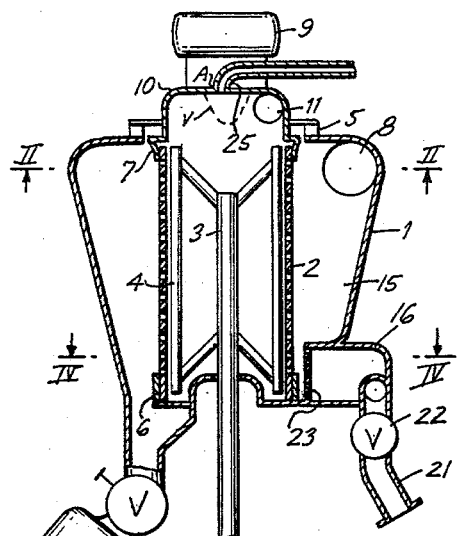
FIG. 1 shows a diagrammatic section of an apparatus according to the present invention.
Figure 2:
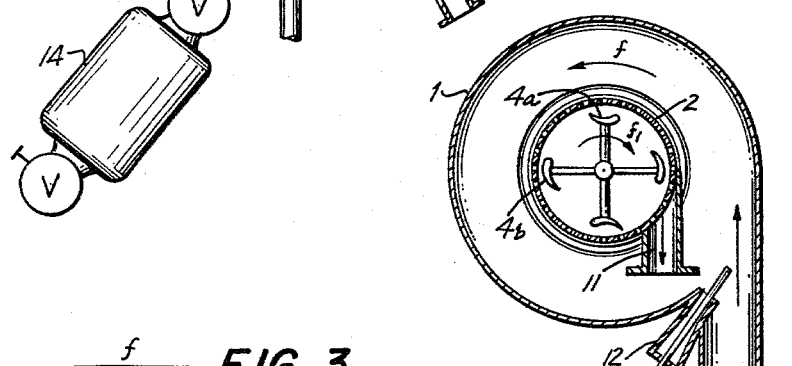
FIG. 2 is a section on the line II—II of FIG. 1.

The apparatus illustrated consists essentially of a tank 1, a cylindrical screening drum 2 disposed inside the tank 1, a rotor 3 carrying blades 4 and having its axis coincident with that of the drum 2. The drum, which is fixed, is supported by flexible studs or blocks 5 fast with the tank 1; it is connected to the bottom of the tank 1 by a flexible joint 6 and to the upper part of the said tank 1 by another flexible joint 7. The suspension and the flexible joints of the drum 2 permit it to carry out oscillatory movements of small amplitude in all directions.

The drum 2 carries a cover 10 formed with an outlet pipe 11 and on which is mounted a vibrator 9. As this vibrator 9 is fast with the drum 2, it communicates to the said drum a vibratory movement at high frequency (for example 3000 cycles per minute). The rotor 3 rotates about its axis at a speed which may be constant or variable; it carries a certain number of blades 4 (four in the drawing). These blades 4 are shaped in two different ways, which classifies them in two categories: the centrifugal blades $4a$ and the centripetal blades $4b$, arranged alternately on the rotor. As their name indicates, the blades $4a$ are shaped and inclined in such a manner that they apply centrifugal force to the suspension to be screened and the blades $4b$ are such that they cause a centripetal movement within the liquid.

The tank 1 has the form of a truncated cone with a vertical axis, the small base of which is at the lower end, whereas the screening drum 2, the axis of which coincides with that of the tank 1, is cylindrical. Under these conditions, the width of the annular space 15 between the drum 2 and the tank 1 decreases in a downward direction.

The tank 1 comprises an inlet union or inlet means 8 which is disposed tangentially at the upper end of the tank 1.

The speed of the liquid at its entry into the apparatus and consequently the speed of rotation assumed by this same liquid in the tank 1 under the action of its tangential inlet can be regulated at will, whatever may be the speed of flow through the apparatus, by a valve 12 in the form of a nozzle.

Moreover, the bottom of the tank communicates firstly with a lock chamber 14 and secondly with a chamber 16 by way of a conduit 17. The latter is disposed tangentially of the tank 1 so that the gyratory current obtaining therein sweeps into the said chamber.

An automatic control valve 18 permits the conduit 17 to be closed when desired and an injection nozzle 19 for dilution water discharges opposite a construction 20 of Venturi form in the conduit 17.

A short pipe 21 fitted with an automatic valve 22 permits the emptying of the chamber 16. That surface of the chamber 16 which faces the screen 2 of the apparatus is formed by a perforated metal plate 23 forming a sieve disposed at a small distance from the screen 2 of the apparatus.

A nose-shaped wall 24 precedss the sieve 23 so that the space between the screen 2 of the apparatus on the one hand, and the nose 24 and the sieve 23 on the other hand increases in size in the direction of the gyration of the liquid contained in the tank 1.

Finally, a conduit 25 is provided which communicates at one end with the top of the tank 1 and which can be connected at the other end thereof to a vacuum source (not shown).

The operation of the apparatus is as follows:

The suspension to be screened enters by way of the pipe 8, fills the tank 1, traverses the screening drum 2 and leaves by way of the pipe 11. Under the action of its tangential entry by way of the pipe 8, the liquid is given a speed of rotation in the tank 1, thus forming a cyclone. Under the action of the centrifugal force obtained within the cyclone, the impurities which have a density slightly higher than that of the suspension are directed towards the wall of the tank 1, while the suspension passes through the screen 2. The impurities which are centrifuged follow a helical path along the wall of the tank 1, the conicity of which has been chosen to this end, and accumulate in the lock chamber 14, which is periodically emptied.

The light impurities contained in the suspension and on which the cyclone has no action, are stopped by the screen drum 2 and, under the action of the liquid current, they accumulate in the bottom of the tank 1 and leave the latter by way of the pipe 17. If neither blades 4 nor a vibrator 9 are provided on the drum 2, the latter would very quickly become clogged and the suspension would no longer be able to pass through it. However, because of the rotor, each time one of its centrifugal blades 4a passes before a point of the drum 2, the liquid flow at this point, which was directed in the inward direction, is reversed for a short instant and becomes outwardly directed. This reversal of the flow cleans the drum in countercurrent and once again permits the suspension to pass through it. An instant after the passage of the blade 4a in front of the said point, the liquid flow thus starts to be inwardly directed again, it is then that the centrifugal blades 4b is present and accelerates this flow, thus causing the passage of a certain quantity of the suspension to the interior of the drum. The blade 4a, which follows the blade 4b, now arrives and the process recommences. Because of the shapes and the proportions adopted for the blades 4a and 4b and because the pressure upstream of the apparatus is higher than that downstream, the inwardly directed flow is stronger than the externally directed flow caused by the blades 4a; the result is thus an inwardly directed flow, representing the rate of flow of the apparatus.

The action of declogging the screen by means of the rotor blades is, if necessary, completed by the vibration imparted to the drum 2 by the vibrator 9. Actually, the high frequency vibration prevents the impurities of the suspension which are retained on the outside of the drum from adhering to the latter and thus assures a perfect cleaning of the screen by the countercurrent caused by the blades 4a. On the other hand, the vibration, in preventing the fine particles of the suspension from adhering to the screen, greatly facilitates the passage when the current, under the action of the blades 4b is directed in the inward direction. The results obtained in practice with this arrangement are an increase in the rate of flow per unit of surface and the possibility of adopting finer perforations for the screen, while operating with a higher concentration of the suspension to be screened.

The flexible suspension of the drum 2, which permits the latter to vibrate, has another advantage; the pressures and vacua to which the screen is subjected set up quite considerable alternate stresses on the said screen and these can cause deterioration of the latter after a certain time, if the drum were held rigidly, as is the case in the known embodiments. In the present apparatus, the flexible securing of the drum largely damps the stresses to which it is subjected and thus eliminates the dangers of deterioration due to these stresses.

Another phenomenon due to the vibration of the screening drum 2 is to be referred to here. This vibration, in being reflected within the liquid contained between the drum 2 and the tank 1, causes an accelerated decantation of the heavy impurities, thereby preventing them from adhering to the flocks of fibres contained in the suspension to be screened. The heavy particles, thus freed of their fibrous waste by the vibration, are more easily centrifuged by the cyclone operative in the tank 1. It must be pointed out here that the action of this cyclone prevents the heavy impurities coming into contact with the wall of the screening drum 2, that is to say, reduces the risks on the one hand of the screen becoming clogged and on the other hand of it being damaged under the action of the shocks caused by the heaviest impurities.

It should be pointed out that in the known apparatus, the blades operate by setting up before them (in the direction of their movement) an increased pressure which accelerates the flow causing the passage of the suspension through the screen and then, by setting up a vacuum behind them, cause the reversal of the flow, this ensuring the declogging of the screen. These pressures and vacua, because of the disposition of the blades, are applied to the surface of the screen which receives the suspension to be cleaned.

In the apparatus illustrated, the pressures and vacua are on the contrary applied to the surface of the screen from when the already cleaned suspension is flowing and they are not caused by the same blades, but by two blades 4a and 4b, each of which is specially designed for its function: 4a for the pressure, 4b for the vacuum or reduced pressure. Moreover, the purpose of these pressures and vacua is reversed. The acceleration of the flow causing the passage of the suspension through the screen is assured by the reduced pressure of the blades 4b, and the reversal of the flow intended for declogging the screen is caused by the increased pressure produced by the blades 4a. This difference is important, because of the two actions, it is the reversal of flow which must be stronger and because it is easier to obtain considerable excess pressures (especially in the centrifugal direction) than appreciable reduced pressures. In the known embodiments, for obtaining these latter, it is necessary to cause the blades to pass quite close to the screening drum, this providing a serious risk of the solid materials of the suspension becoming jammed between the blades and the screen, all the more so because the blades are disposed on the side where the impurities are retained. In the apparatus according to the application, the excess pressures generated by the blades 4a which operate with a centrifugal action are very high, even when the said blades are kept at a relatively large distance from the drum 2. This fact, and the fact that the blades are disposed on the clean side of the screen, eliminate any danger of jamming and of deterioration caused by the impact of the rotor on large impurities.

The presence of the screen 2 has a tendency to cause an appreciable braking in its vicinity of the movement of rotation of the liquid and consequently to decrease the cyclone effect and even to destroy it to a large extent by the appearance of secondary eddies. In order to avoid this and thus to permit the satisfactory operation of the screen-cyclone combination, the following arrangements are used:

(a) The rotor carrying the blades 4a and 4b turns in a direction $f_1$ opposite to the direction $f$ of the liquid disposed between the tank 1 and the screen 2.

Figure 3:
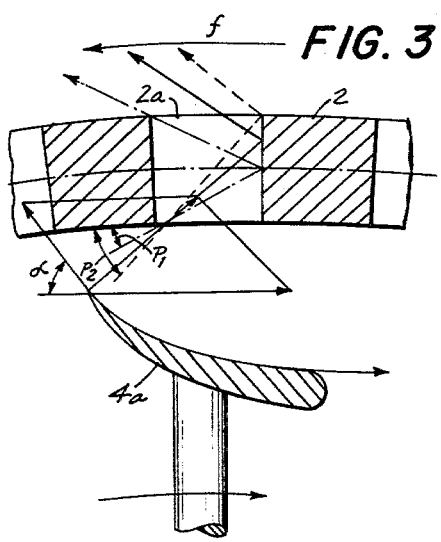
FIG. 3 is a diagram showing certain blades of the apparatus.
Figure 4:
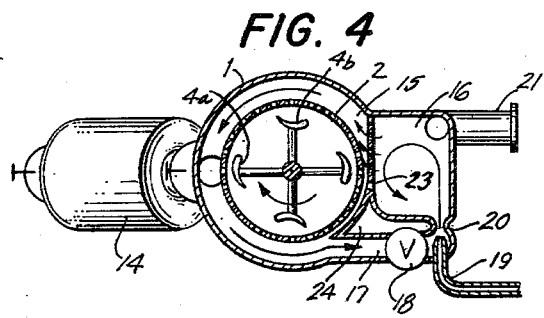
FIG. 4 is a section on the line IV—IV of FIG. 1.

(b) The blades 4a which set up a pressure on the internal face of the drum 2 are characterized, as shown in FIG. 3, by a zero incidence angle and an escape angle $\alpha$ chosen such that the absolute speed of the liquid, on leaving the blade, is between the angles $P_1$ and $P_2$ of FIGURE 3.

In this manner, with each passage of a blade 4a, the liquid which re-traverses the screen 2 rebounds in the perforations 2a of the screen 2 and leaves the latter with a speed directed in the direction of the cyclone indicated by the arrow $f$. The screen, instead of forming a brake for the cyclone, thus becomes a driving element, and by suitably choosing the inlet speed of the liquid and the speed of rotation of the blades 4, it is possible to cause the cyclone to function in the same manner as if the screen 2 did not exist. It is to be noted that the pulsations created by the blades 4 are an element favourable to the efficiency of the cyclone, in that the vibrations which they generate within the liquid promote the separation of the impurities from their fibrous waste.

As already mentioned above, the light impurities contained in the suspension to be screened and which are stopped by the drum 2 are entrained towards the bottom of the tank 1 by the liquid current created by the tangential supply from the pipe 8, this current continuously sweeping over the external face of the drum 2. The impurities are accumulated in the bottom of the tank 1, from whence they are evacuated through the pipe 17.

The operation of the valve 18 comprises three stages:

*1st stage.*—The valve 18 is open and the valve 22 is closed. The fibrous suspension which is gyrating in the tank 15 and which is concentrated with rejected material at the base of the latter pours into the conduit 17 and reaches the chamber 16. Water for dilution purposes is continuously injected through the nozzle 19. The effect of this injection is to dilute the fibrous suspension and also to set up a suction upstream of the Venturi 20 and excess pressure downstream of this Venturi 20. As a result, the pressure obtaining in the chamber 16 is higher than the pressure obtaining in the tank 1. The fibrous suspension in the chamber 16 thus has a tendency to escape therefrom by traversing the sieve 23 so as to reach the tank 1 again, from where it is taken up by the rotational movement of the assembly. The waste material is stopped by the sieve 23 and collects in the chamber 16.

The declogging of the sieve 23, like that of the screen 2 of the apparatus, is assured by the action of the blades 4a. Actually, with each passage of one of these blades 4a, a local excess pressure is set up, comparable to a ram stroke, and in view of the incompressibility of the liquid, this is transmitted through the screen 2 of the apparatus as far as the sieve 23. This excess pressure on the rear face of the sieve 23 causes the reflux of a small quantity of liquid through the latter, which is thus cleaned in countercurrent with each passage of a blade 4a. The sieve 23 thus remains always clean and suitable to permit passage of the fibrous suspension.

*2nd stage.*—The valves 18 and 22 are closed. When a sufficient quantity of rejected material has collected in the chamber 16, the valve 18 is closed, actuated by an adjustable timing mechanism, the valve 22 itself still remaining closed. As the water for dilution purposes always arrives by way of the pipe or nozzle 19, the flow of the liquid is from the chamber 16 towards the tank of the apparatus through the sieve 23. This flow entrains the fibres in the chamber 16, the rejected material being retained by the sieve 23 and thus being washed. This necessary washing time is extended until there are no longer any fibres in the chamber 16.

*3rd stage.*—The valve 18 is closed and the valve 22 is opened. When the rejected material of the chamber 16 is sufficiently washed, the valve 22, controlled by an adjustable timing mechanism, is opened, the valve 18 remaining closed. The chamber 16, which now only contains the rejected material in suspension in the water, is emptied into a drain. The water entering by way of the pipe 19 ensures good rinsing of the chamber 16. When the latter is emptied, the valve 22 is closed and the valve 18 is opened. The operational cycle restarts in a manner identical to that which has just been described. The period of the different phases is adjusted by means of the timing mechanisms as a function of the quantity of rejected material to be discharged.

It is to be pointed out in this connection that this latter arrangement is only possible by virtue of the arrangement described below:

(1) Centripetal operation with a rotor carrying the blades disposed downstream of the screen. This completely frees that face of the screen on which the suspension containing the rejection material is disposed and thus permits the positioning thereon of the chamber 16 with the accessories. It is obvious that in the other apparatus in which the blades are disposed upstream of the screen, it is not possible also to fit an auxiliary device thereon.

(2) Declogging of the screen by means of large local excess pressures due to the centrifugal action of the blades, which permits the cleaning in series of the screen proper and of the auxiliary sieve. This cleaning in series is not possible in the other apparatus where the declogging is due to local reduced pressures created by the centripetal action of the blades. Actually, a vacuum or reduced pressure is not transmitted in a liquid in the same manner as an excess pressure and the centripetal effect of a blade cannot be as large as a centrifugal effect.

The chamber 16, with its accessories, makes the apparatus which has been described autonomous in the sense that the rejected materials leaving the apparatus are perfectly washed and thus it is not necessary to have auxiliary apparatus for treating them afresh in order to recover the fine elements which could be mixed therein. It is only in the case where the quantity of impurities contained in the suspension is very large that it will be of interest to dispense with the chamber 16 and to use an auxiliary apparatus connected by the pipe 17 to the apparatus which has been described.

There will now be described one method of operation of the apparatus according to the invention which permits of carrying out a deaeration of the suspension.

This is desirable, because the fibrous suspensions easily retain air as fine bubbles attached to the fibres, and this is inconvenient, especially for the operation of machines on which a sheet of paper is formed.

In the apparatus according to the application, the liquid inside the screen 2 is driven by the rotor 3 at a certain sped of rotation slower than the speed of the rotor 3, but nevertheless quite considerable. This gyratory movement of the liquid tends to centrifuge it and the discharge pipe 11, being placed tangentially and towards the exterior in the direction of the gyratory movement, gives the apparatus a power of delivery under pressure.

To be more precise, it can be said that, assuming the apparatus to be full, if P is the pressure in the outlet pipe 11 and P′ is the pressure at the point A disposed at the top and axially of the apparatus, then P is greater than P′. On the other hand, in order that the apparatus remains full, P must be greater than the value $P_m$ (dependent on the speed of rotation), below which a vortex appears at the point A and corresponding to a value of P′ equal to atmospheric pressure. If the pressure which is used at the outlet P is smaller than $P_m$, it is necessary to create a loss in load (constriction by a valve) in order to avoid the formation of a very large vortex which would involve the danger of the blades being uncovered.

Another method of operation consists in creating a vacuum at A, for example by means of a vacuum pump, which keeps P′ at a value lower than the atmospheric pressure H and almost equal to the value $H-(P_m-p)$. There is thus formed at A a small vortex V limited to the desired height. In this vortex V, the air bubbles are combined under the effect of a double action; the centrifugal separation due to the rotation and the vacuum obtained at A. The air is then evacuated through the tube 25 connected to the vacuum source. There is thus obtained a deaeration of the fibrous suspension. It is possible to regulate automatically the height of the vortex V by means of a float acting on a vacuum regulator.

In other apparatus which function by centrifugal action, that is to say, in which the liquid arrives by way of the pipe 11, it is not possible to use vacuum, for the following reason:

The pressure P obtained upstream of the screen is equal to $p+\Delta p$, $\Delta p$ being the loss of load due to passing through the screen. This value $p+\Delta p$ is practically always greater than $P_m$. As P is of the order of magnitude of $P_m$, the pressure P′ at the point A is thus higher than atmospheric pressure; A vortex is thus not set up and it is not possible to produce the vacuum. The deaeration is thus less efficient than in the apparatus according to the invention.

I claim:

1. In a screening apparatus for screening fibres in liquid suspension, in combination, a tank having a peripheral wall; a substantially cylindrical screen within said tank spaced from said peripheral wall and forming a screening chamber in said tank; inlet means communicating with said tank for introducing fibres in liquid suspension to the outside of said screening chamber so that the liquid and part of the fibres suspended therein will pass through said screen into said screening chamber while rejected fibres and other heavy solid particles will be held back by the screen; outlet means communicating with the interior of said screening chamber for discharging therefrom stock passed through said screen; and rotor means in the interior of said cylindrical screen substantially coaxially therewith and including at least a pair of blades angularly displaced from each other, one of said blades having a concavely curved surface facing the inner surface of the screen and having a trailing edge located closer to said inner screen surface than the leading edge thereof so as to provide, during rotation of said rotor means, an increased pressure on the inner surface of said screen facing at any instant said one blade means and the other of said blades having a convexly curved surface facing the inner surface of said screen and having a leading edge located closer to said inner screen surface than the trailing edge thereof so as to provide a suction on the inner surface of said screen facing at any instant said other blade.

2. An arrangement as defined in claim 1 and including an even number of blades more than 2 angularly displaced from each other and said concavely and convexly curved blades alternating with each other.

3. In a screening apparatus for screening fibres in liquid suspension, in combination, a tank having a peripheral wall of substantially circular cross-section; a substantially cylindrical screen arranged within said tank substantially coaxially with said peripheral wall and forming a screening chamber within said tank and between said screen and said peripheral wall an annular space; inlet means arranged tangentially to the peripheral wall for feeding fibres in liquid suspension into said annular space to produce a cyclone effect causing the stock to rotate in one direction in said annular space to separate thereby heavy impurities by centrifugal action from the stock and causing the stock to sweep over the outer surface of the screen so that the liquid and part of the fibres suspended therein will pass through said screen into said screening chamber while rejected fibres will be held back by the screen; outlet means communicating with the interior of said screening chamber for discharging therefrom stock passed through said screen; rotor means in the interior of said cylindrical screen substantially coaxial therewith and including at least a pair of blade means angularly displaced from each other, one of said blade means constructed so as to provide, during rotation of said rotor means, an increased pressure on an inner surface portion of said screen facing at any instant said one blade means and the other of said blade means constructed so as to provide a suction on an inner surface portion of said screen facing at an instant said other blade means; a reject chamber adjacent said tank for receiving fibres rejected by said screen; and a conduit communicating with an end portion thereof arranged tangentially with respect to said peripheral wall of said tank with the interior of the latter and with the other end thereof communicating with the interior of said reject chamber.

4. An arrangement as defined in claim 1 in which said reject chamber abuts with a portion thereof against said peripheral wall of said tank and including an additional screen in said abutting portion and forming an additional communication between said tank and said reject chamber, said additional screen being located in the path of the pressure waves produced by the blade means of said rotor means.

5. An arrangement as defined in claim 4 and including a valve in said conduit for opening and closing the latter, and Venturi means for injecting water under pressure into said conduit and into said reject chamber for increasing passage of stock from the tank through said conduit into said reject chamber and from the latter through said additional screen back into said tank while subjecting the fibres passing through said reject chamber to a washing section.

6. An arrangement as defined in claim 5 and including discharge means communicating with said reject chamber, and automatic valve means for controlling said discharge means.

References Cited by the Examiner
UNITED STATES PATENTS

| | | | |
|---|---|---|---|
| 2,003,150 | 5/35 | Knight | 210—273 |
| 2,107,406 | 2/38 | Wood | 210—412 |
| 2,465,623 | 3/49 | Zika | 210—406 |
| 2,775,348 | 12/56 | Williams | 210—412 |
| 2,835,173 | 5/58 | Martindale | 210—415 |
| 2,908,390 | 10/59 | Rich et al. | 210—413 X |
| 2,936,895 | 5/60 | Cusi | 210—412 |
| 2,975,899 | 3/61 | Cannon et al. | 210—415 X |
| 3,053,391 | 9/62 | Nelson | 210—304 |

HARRY B. THORNTON, *Primary Examiner.*

HERBERT L. MARTIN, *Examiner.*